US011668799B2

(12) United States Patent
Wu

(10) Patent No.: US 11,668,799 B2
(45) Date of Patent: Jun. 6, 2023

(54) HISTOGRAM BASED L-SHAPE DETECTION OF TARGET OBJECTS

(71) Applicant: Aptiv Technologies Limited, St. Michael (BB)

(72) Inventor: Mo Wu, Oak Park, CA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 471 days.

(21) Appl. No.: 16/825,242

(22) Filed: Mar. 20, 2020

(65) Prior Publication Data

US 2021/0293930 A1 Sep. 23, 2021

(51) Int. Cl.
*G01S 7/48* (2006.01)
*G01S 17/931* (2020.01)
(Continued)

(52) U.S. Cl.
CPC ............ *G01S 7/4808* (2013.01); *G01S 13/89* (2013.01); *G01S 13/931* (2013.01); *G01S 17/89* (2013.01); *G01S 17/931* (2020.01); *G06F 18/23* (2023.01)

(58) Field of Classification Search
CPC ...... G01S 17/931; G01S 17/89; G01S 13/931; G01S 7/4808; G01S 7/4802; G01S 13/89; G01S 17/66; G01S 17/00; G01S 17/02; G01S 17/04; G01S 17/06; G01S 2207/30252; G01S 7/12; G01S 2207/10016; G01S 2200/04; G01S 2207/30261;
(Continued)

(56) References Cited

U.S. PATENT DOCUMENTS 7,741,961 B1 * 6/2010 Rafii .................... G06T 7/20
348/148
8,605,998 B2 12/2013 Samples et al.
(Continued)

FOREIGN PATENT DOCUMENTS

CN 107025642 A 8/2017
CN 107025642 B 6/2018
(Continued)

OTHER PUBLICATIONS

Bosse, Michael, and Robert Zlot. "Map matching and data association for large-scale two-dimensional laser scan-based slam." The International Journal of Robotics Research 27.6 (2008): 667-691 (Year: 2008).*

(Continued)

*Primary Examiner* — Yoshihisa Ishizuka
*Assistant Examiner* — Carter W Ferrell
(74) *Attorney, Agent, or Firm* — Billion & Armitage

(57) ABSTRACT

A method of detecting L-shaped target objects within a point cloud includes rotating a target point cloud through a plurality of rotation angles and generating at least one weighted histogram for each of the plurality of rotation angles, wherein the weighted histogram includes a first plurality of bins, each bin having a width defined in a first axis, wherein each bin is weighted based on a number of points located within the bin and a distance between points in a direction perpendicular to a width of the bin. A score is generated for each of the plurality of rotation angles based on the at least one weighted histogram and determining whether a target point cloud is L-shaped based on the generated scores.

18 Claims, 9 Drawing Sheets

(51) Int. Cl.
　　　*G01S 13/89*　　(2006.01)
　　　*G01S 13/931*　　(2020.01)
　　　*G01S 17/89*　　(2020.01)
　　　*G06F 18/23*　　(2023.01)

(58) Field of Classification Search
　　CPC ... G01S 5/40; G01S 7/246; G01S 7/70; G06T 2207/10028; G06T 7/12; G06T 7/11; G06T 7/13; G06T 7/10; G06T 2207/30261; G06T 7/73; G06T 7/70; G06T 2210/12; G06T 2219/2016; G06V 20/64; G06V 20/58; G06V 20/56; G06V 10/50; G06V 10/44; G06V 10/255; G06K 9/6215; G06K 9/6218
　　See application file for complete search history.

(56) References Cited

U.S. PATENT DOCUMENTS

| | | |
|---|---|---|
| 8,825,260 B1 | 9/2014 | Silver et al. |
| 9,014,903 B1 | 4/2015 | Zhu et al. |
| 9,208,609 B2 | 12/2015 | Taguchi et al. |
| 10,031,231 B2 | 7/2018 | Zermas et al. |
| 10,229,330 B2 | 3/2019 | Li et al. |
| 10,438,371 B2 | 10/2019 | Xu et al. |
| 2011/0295458 A1 | 12/2011 | Halsey-Fenderson |
| 2013/0251194 A1* | 9/2013 | Schamp ............... G06T 7/11 382/199 |
| 2017/0103524 A1* | 4/2017 | Franz ............... G06T 7/0012 |
| 2017/0337432 A1* | 11/2017 | Maeda ............... G01S 13/04 |
| 2019/0004166 A1 | 1/2019 | Orlowski et al. |
| 2019/0277960 A1 | 9/2019 | Schiffmann et al. |
| 2020/0043186 A1* | 2/2020 | Selviah ............... G06V 10/7515 |
| 2021/0263135 A1* | 8/2021 | Chen ............... G06V 10/44 |

FOREIGN PATENT DOCUMENTS

| | | |
|---|---|---|
| DE | 102014007565 A1 | 11/2015 |
| WO | 2015002113 A1 | 1/2015 |

OTHER PUBLICATIONS

Kasaei, S. Hamidreza, et al. "GOOD: A global orthographic object descriptor for 3D object recognition and manipulation." Pattern Recognition Letters 83 (2016): 312-320 (Year: 2016).*

X. Shen, S. Pendleton, and M. H. Ang, "Efficient L-shape fitting of laser scanner data for vehicle pose estimation," Proc. 2015 7th IEEE Int. Conf. Cybern. Intell. Syst. CIS 2015 Robot. Autom. Mechatronics, RAM 2015, No. 2, pp. 173178, 2015.

Tobias Nystram Johansson, "LiDAR Clustering and Shape Extraction," Masters Thesis, Chalmer Univ. of Technology, 2017.

X. Zhang, W. Xu, C. Dong, and J. M. Dolan, "Efficient L-shape fitting for vehicle detection using laser scanners," IEEE Intell. Veh. Symp. Proc., pp. 5459, 2017.

D. Kim, K. Jo, M. Lee, and M. Sunwoo, "L-Shape Model Switching-Based Precise Motion Tracking of Moving Vehicles Using Laser Scanners," IEEE Trans. Intell. Transp. Syst., vol. 19, No. 2, pp. 598612, 2018.

English Abstract Translation DE102014007565A1, published Nov. 26, 2015.

Extended European Search Report for EP Application No. 21162476.2, dated Aug. 16, 2021, 8 pages.

Martens, et al., "An automated approach for point cloud alignment based on density histograms", 11 pages.

XP055830142, Retrieved from the Internet: http://ceur-ws.org/vol-2394/paper24.pdf.

* cited by examiner

HISTOGRAM BASED L-SHAPE DETECTION OF TARGET OBJECTS

FIELD

This disclosure is generally directed to object detection and more specifically to L-shaped object detection.

BACKGROUND

Driver assist systems and autonomous vehicles rely on a variety of sensing technologies to reliably sense and interpret surroundings. Sensing technologies utilized include light detection and ranging (LiDAR), radar, and camera-based systems, working independent or in conjunction with one another.

LiDAR-based systems operate by generating a light signal (e.g., laser) and measuring the reflections of the generated light signals to determine the distance to nearby objects. The output is a point cloud comprised of a plurality of points, each point representing a reflection with an object. Subsequent analysis is required to interpret and identify objects within the point cloud, including segmentation and clustering at points to identify target objects. Additional processing is utilized to recognize target objects (e.g., vehicles, tree, pedestrian, etc.). For example, L-shape fitting is utilized to identify the L-shape commonly associated with vehicles in order to determine the orientation and heading of adjacent vehicles. However, traditional L-shape clustering suffers from high computational cost and poor performance when the target vehicle does not have a well-defined corner or if the target vehicle includes objects extending out from the side of the vehicle (e.g., side-view mirrors).

SUMMARY

According to some aspects, a method of detecting L-shaped target objects within a point cloud includes rotating a target point cloud through a plurality of rotation angles and generating at least one weighted histogram for each of the plurality of rotation angles, wherein the weighted histogram includes a first plurality of bins, each bin having a width defined in a first axis, wherein each bin is weighted based on a number of points located within the bin and a distance between points in a direction perpendicular to a width of the bin. A score is generated for each of the plurality of rotation angles based on the at least one weighted histogram and determining whether a target point cloud is L-shaped based on the generated scores.

According to another aspect, a method of determining a pointing angle of a target object includes receiving a target point cloud representing at least a portion of the target object, the target point cloud comprised of a plurality of points defined by a distance from a sensor. The target point cloud is rotated through a plurality of rotation angles. A first weighted histogram and a second weighted histogram is generated for each of the plurality of rotation angles, wherein the first weighted histogram includes a first plurality of bins, each bin having a width defined in an x-axis, wherein the second weighted histogram includes a second plurality of bins, each bin having a width defined in a y-axis, wherein each bin is weighted based on a number of points located within the bin and a distance between points in a direction perpendicular to a width of the bin. A score is generated for each of the plurality of rotation angles based on the first weighted histogram and the second weighted histogram. The pointing angle of the target object is identified based on the scores generated for each of the plurality of rotation angles.

According to some embodiments, an L-shaped target detection system includes a sensor and a controller. The sensor is configured to generate a point cloud comprised of a plurality of points generated with respect to targets located proximate to the sensor, wherein points associated with a particular target comprise target point clouds. The controller is configured to receive the point cloud generated by the sensor and is further configured to rotate the target point cloud through a plurality of rotation angles. The controller generates a first weighted histogram and a second weighted histogram for each of the plurality of rotation angles, wherein the first weighted histogram includes a first plurality of bins, each bin having a width defined in an x-axis, wherein the second weighted histogram includes a second plurality of bins, each bin having a width defined in a y-axis, wherein each bin is weighted based on a number of points located within the bin and a distance between points in a direction perpendicular to a width of the bin. The controller generates a score for each of the plurality of rotation angles based on the first weighted histogram and the second weighted histogram and identifies the pointing angle of the target object based on the scores generated for each of the plurality of rotation angles.

DESCRIPTION OF THE DRAWINGS

FIG. 7b is the weighted y-axis histogram generated in response to boundary points shown in FIG. 7a; FIG. 7c is the weighted x-axis histogram generated in response to boundary points shown in FIG. 7a.

FIG. 8b is the weighted y-axis histogram generated in response to boundary points shown in FIG. 8a; FIG. 8c is the weighted x-axis histogram generated in response to boundary points shown in FIG. 8a.

DETAILED DESCRIPTION

For autonomous and semi-autonomous vehicles, a variety of different sensors are utilized to scan the environment surrounding the vehicle. For example, LiDAR-based systems generate light pulses that reflect from adjacent objects thereby providing information regarding the distance from the sensor to the point of the reflection. Each reflection resulting in a point defined in three-dimensional space, the plurality of points making up a point cloud that represents the environment surrounding the vehicle. Processing of the point cloud may include clustering adjacent points in order to identify target point clouds, each target point cloud represents a target object (e.g., vehicle). As part of the process of identifying objects, determining the direction the target objects are pointing is important (i.e., orientation or pointing angle of the target). The orientation is oftentimes determined by assuming a rectangular shape of vehicles and looking in particular for the L-shape or corner associated with a vehicle. The pointing angle of a target object refers to the angle parallel to the body side of the target object (assuming the target object is a vehicle) and pointing to the front of the vehicle.

For target objects lacking a well-defined corner, L-shape detection may be difficult. According to some embodiments, a weighted histogram approach is utilized to determine whether a target object is L-shaped and further to detect the pointing angle of the target object. In some embodiments, this includes extracting a plurality of boundary points from the target point cloud. In general, the extracted boundary points approximate the outline of the target object. The orientation of the boundary points is rotated about a point, and at each rotation angle the points are organized into a first weighted histogram (e.g., x-axis histogram) and a second weighted histogram (e.g., y-axis histogram). The first weighted histogram includes a first plurality of bins, each bin having a width defined along the x-axis, wherein the second weighted histogram includes a second plurality of bins, each bin having a width defined along the y-axis. Each bin is weighted based on a number of points located within the bin and a distance between points in a direction perpendicular to a width of the bin. A bin having a high number of points spread over a large distance in a direction perpendicular to the bin indicates a large number of approximately aligned points. If both weighted histograms have a bin with these characteristics at a particular angle of rotation, this indicates the presence of an L-shape.

Figure 1A:
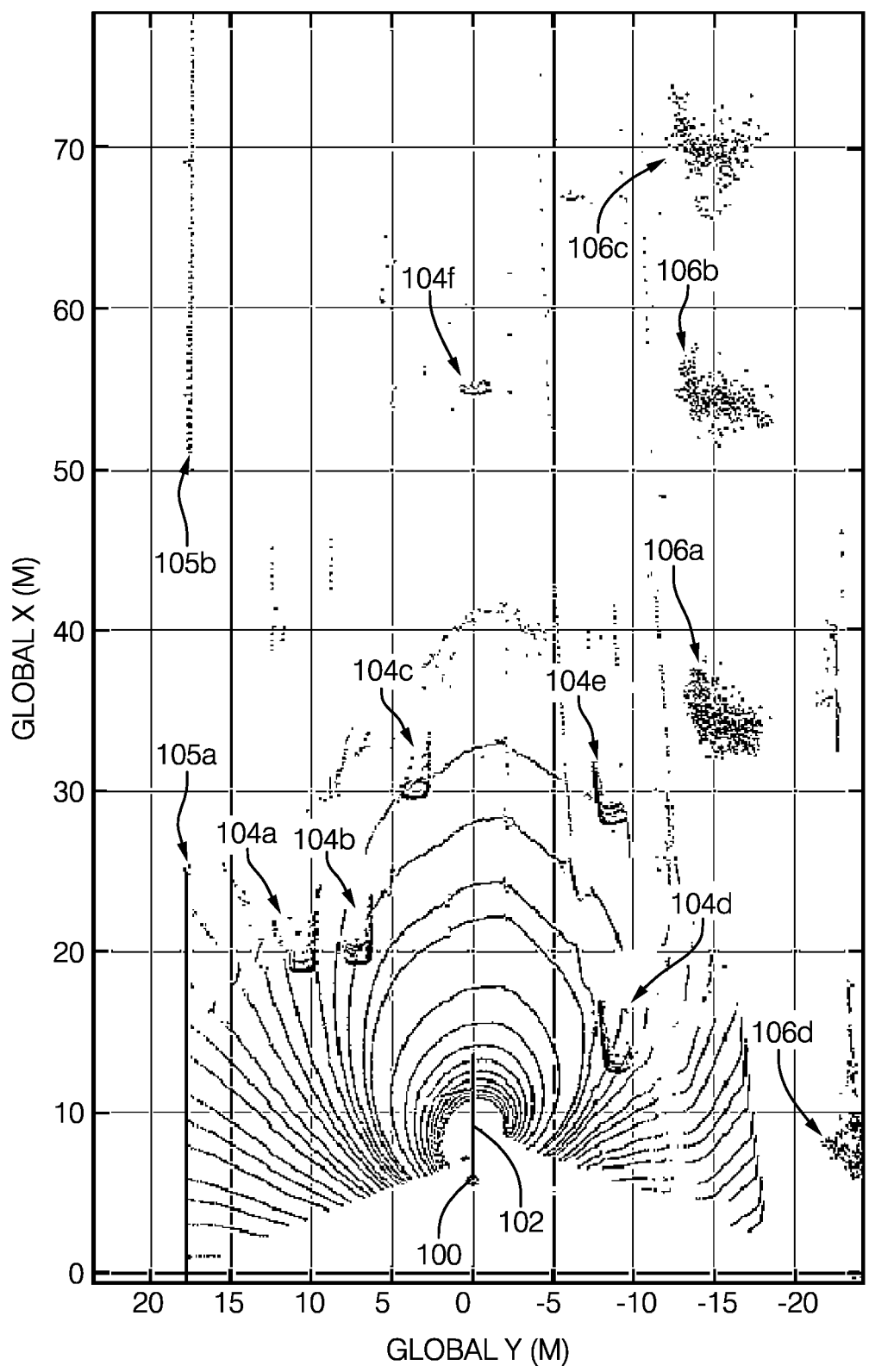
FIG. 1a is a top view of a point cloud generated by one or more sensors located on the front bumper of a vehicle according to some embodiments.
Figure 1B:
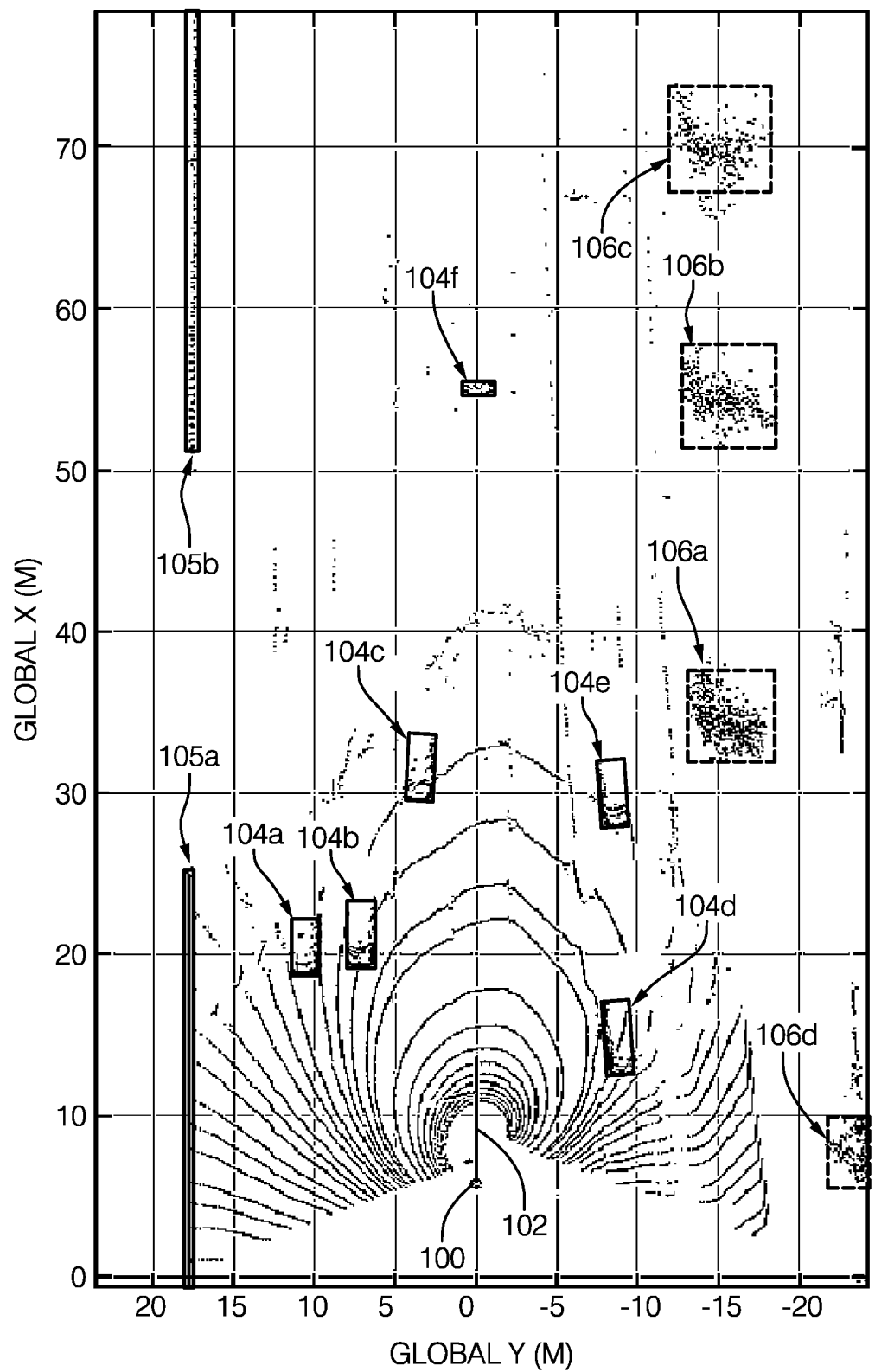
FIG. 1b is a top view of the point cloud generated by one or more sensors that includes bounding boxes generated with respect to target objects according to some embodiments.

FIG. 1a is a top view of a point cloud generated by one or more sensors located on the front bumper of a vehicle 100, and projected into world coordinate system, according to some embodiments. FIG. 1b is a top view of the same point cloud following detection of L-shaped target objects and generation of bounding boxes around detected target objects. In the embodiment shown in FIG. 1a, the point labeled 100 represents the location of the vehicle and line 102 represents the heading and speed of the vehicle 100. The vehicle 100 includes a one or more sensors (not shown) utilized to scan the surrounding environment and generate the point cloud illustrated. In the view shown in FIG. 1a, the plurality of points has been organized into clusters of target objects, including a plurality of target objects 104a-104e (collectively, 104), 105a-105b (collectively 105) and 106a-106e (collectively 106). In this example, target objects 104 are each comprised of a plurality of points located in a definite L-shape, and objects 105 are each comprised of points organized along a single straight line (a special case of L-shape). In contrast, target objects 106 are each comprised of a plurality of points not organized in any definite shape. The L-shaped target objects 104 are likely representative of vehicles, target object 105 are likely representative of guardrails, whereas the plurality of target objects 106 are likely not representative of vehicles or guardrails, but rather are likely road-side vegetation or other indefinite surface. Methods described herein are utilized to analyze the plurality of target objects 104, 105, and 106 to determine whether a target object is L-shaped and, if so, determine the pointing angle of the L-shaped object. For example, in the embodiment provided in FIG. 1b, the point clouds associated with each of the target objects 104, 105, and 106 are analyzed and those having a defined L-shape (namely, target objects 104 and 105) are identified as such. Target objects not characterized by a defined L-shape, such as target objects 106 are similarly identified as such. In some embodiments, bounding boxes are drawn around the objects and orientations of the target objects are defined based on the previous determinations. For example, those target objects defined by an L-shape are shown with solid bounding boxes (e.g., target objects 104 and 105), wherein the orientation of the bounding box is rotated by the optimal orientation/pointing angle determined based on the analysis utilized to detect the L-shape. In some embodiments, a determination of whether an L-shaped object (e.g., 104 or 105) represents a vehicle or some other L-shaped object such as a guardrail is determined downstream based on additional inputs (e.g., speed, size, heading of the L-shaped object). Those target objects not defined by an L-shape are shown with a dashed bounding box (e.g., target objects 106). In some embodiments, for objects not defined by an L-shape, the orientation of the object may be set equal to the orientation of the host vehicle.

In the top view shown in FIGS. 1a and 1b, the point cloud is projected onto a coordinate system. For example, in some embodiments the coordinate system is a world coordinate system that originates from host vehicle's starting point. In the example provided in FIGS. 1a and 1b, object 104b (likely a vehicle) has an orientation relatively similar to that of the host vehicle 100, which suggests that the target object 104b is traveling parallel to the host vehicle 100 in an adjacent lane. In contrast, the orientation of target object 104d is noticeably different, suggesting lane-changing/merging maneuvers. In contrast, object 106a does not have distinguishable L-shape, and the orientation of which is assigned to the 'default value' (the host vehicle's orientation), and marked differently from those with L-shape.

Figure 2:
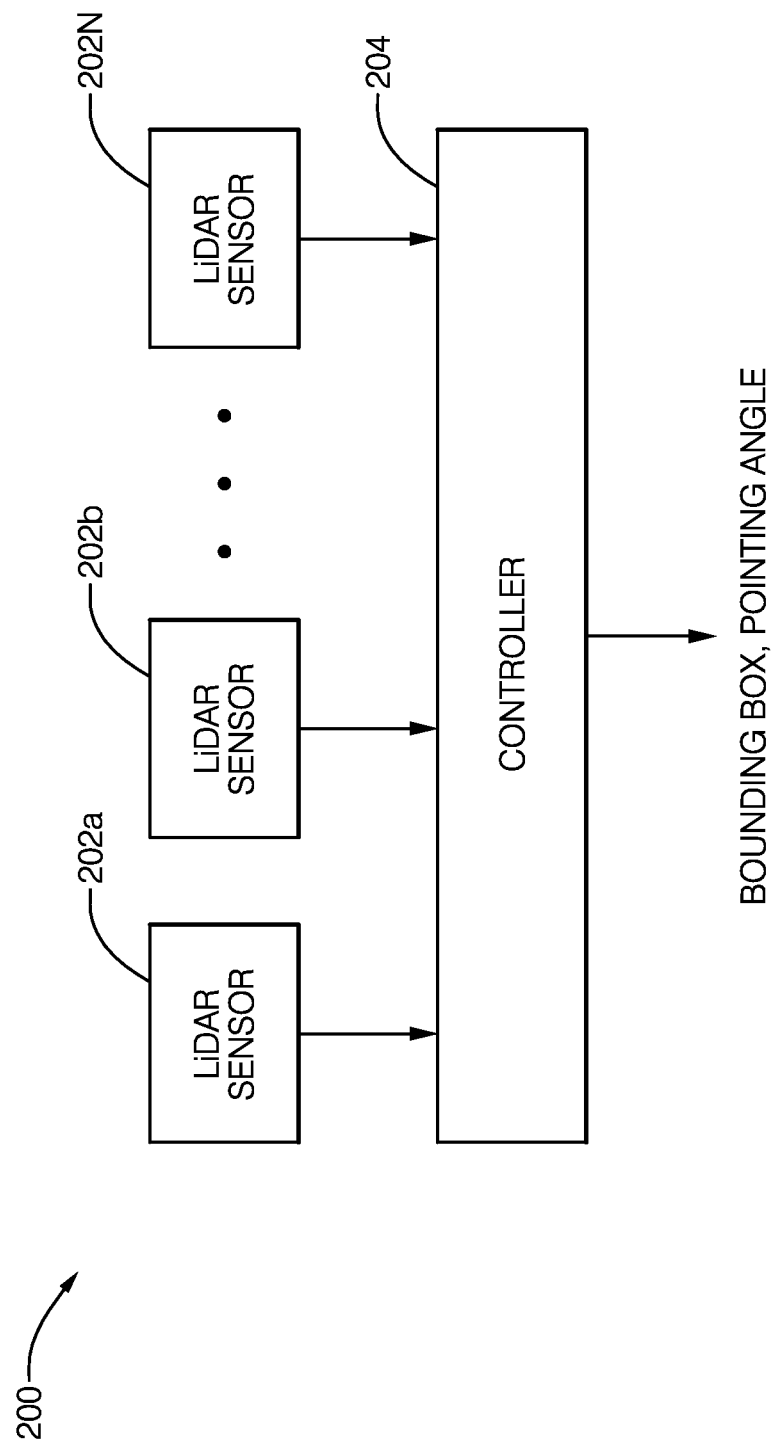
FIG. 2 is a block diagram of a LiDAR-based object detection system according to some embodiments.
Figure 3:
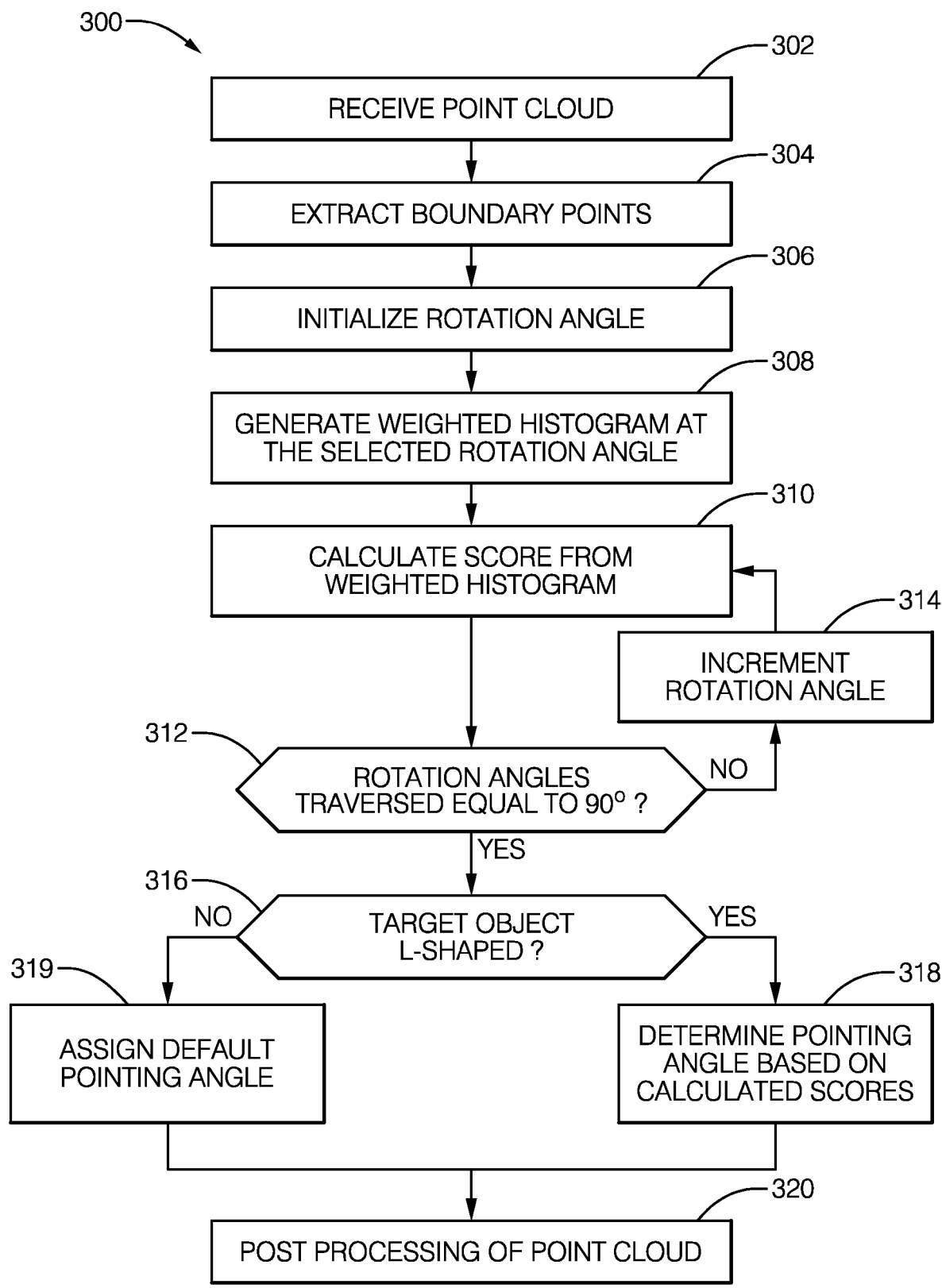
FIG. 3 is a flowchart illustrating histogram-based L-shape detection according to some embodiments.
Figure 4:
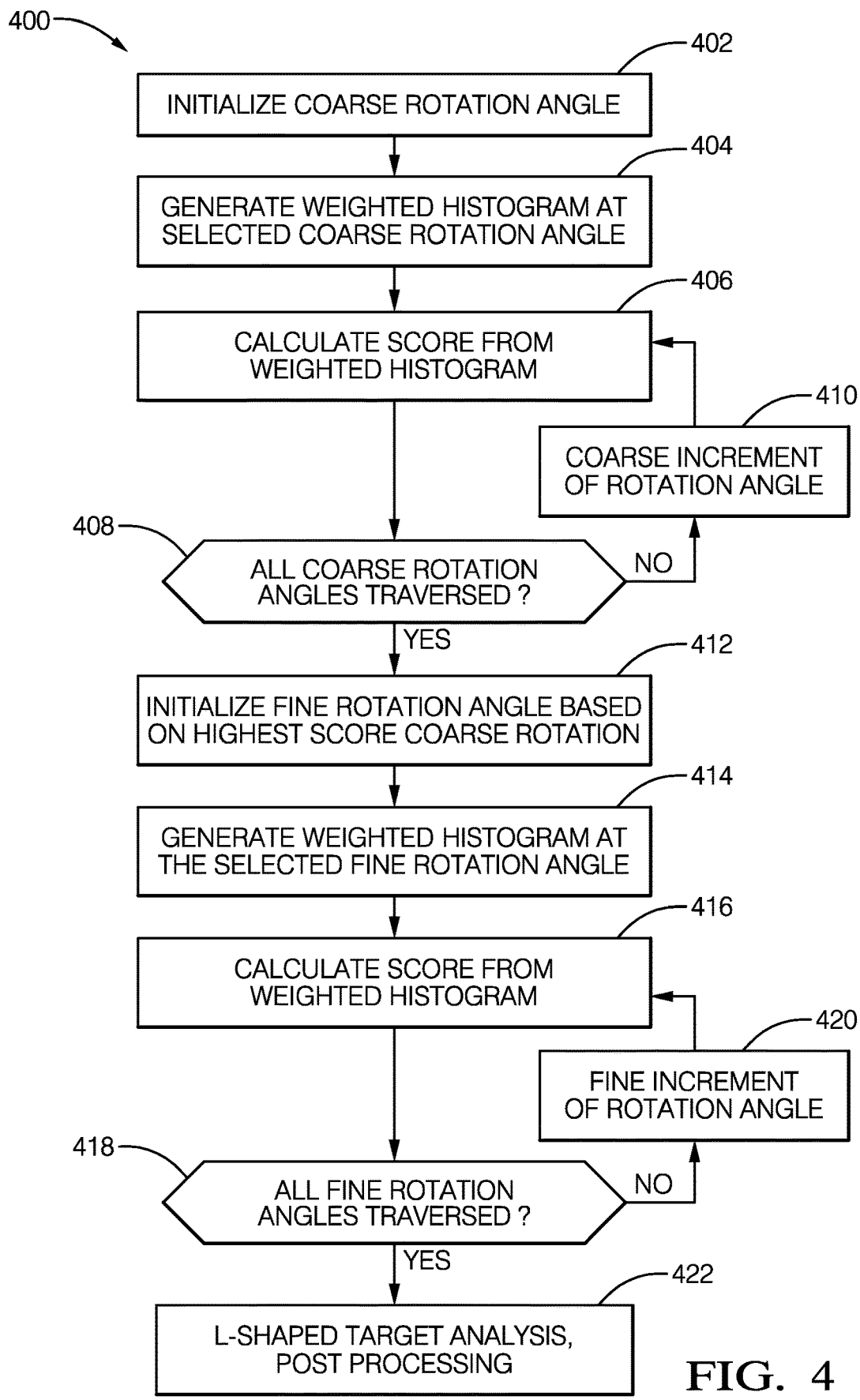
FIG. 4 is a flowchart illustrating two-stage histogram-based L-shape detection according to some embodiments.

Referring now to FIGS. 2-4, a system and various methods of determining the pointing angle of target objects is illustrated. In particular, FIG. 2 is a block diagram of a LiDAR-based object detection system 200, which includes one or more sensors 202a, 202b, . . . 202N (collectively, sensors 202) and a controller 204. In some embodiments, the one or more sensors 202 are LiDAR sensors that operate by generating a light beam and monitoring reflections from distant objects. In other embodiments, sensors 202 may be radar sensors, cameras, or other devices capable of capturing information associated with the surrounding environment. The one or more sensors 202 provide as an output a point cloud comprised of a plurality of points located in three-dimensional space. Controller 204 receives the point cloud or plurality of point clouds. In some embodiments, controller 204 performs clustering of points within the point cloud to identify target objects. In other embodiments, each of the one or more sensors 202 provides some processing/analysis of collected point clouds.

For the sake of simplicity, it is assumed that points have already been segmented or clustered into target point clouds, each target point cloud representing a target object. Based on the target point clouds, controller 204 determines whether the target object is L-shaped and if so determines the pointing angle of the target object. In some embodiments, controller 204 may also determine the bounding box that defines the space occupied by the target object.

According to some embodiments, FIG. 3 illustrates steps implemented by controller 204 to determine whether a target object is L-shaped and further to determine the pointing angle of the target object. At step 302, the point cloud is received. As discussed above, in some embodiments controller 204 receives and aggregates points clouds measured by one or more sensors (e.g., LiDAR sensors), and applies clustering techniques to identify target point clouds representing target objects. In other embodiments, at least some of the processing of the point cloud is provided by the sensors 202, wherein controller receives target point clouds representing target objects. At step 302, it is assumed that the received point cloud has already been clustered into a plurality of target point clouds. For example, referring to the example provided in FIG. 1a, a target point cloud may comprise of the plurality of points associated with target object 104a. At this stage, no determination has been made that the target point cloud includes an L-shaped boundary, and further no determination has been made regarding pointing angle or bounding box associated with the target point cloud.

Figure 6:
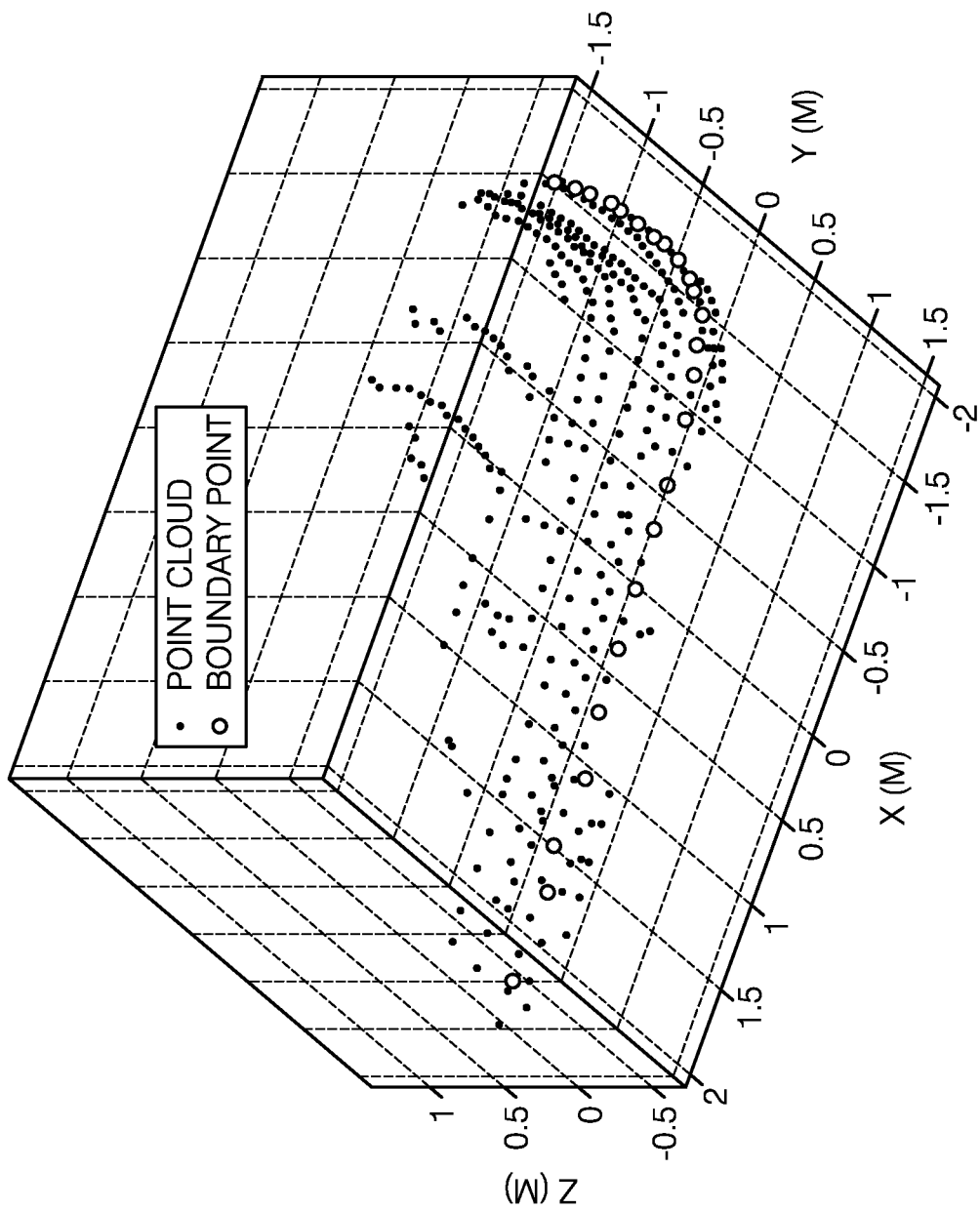
FIG. 6 is a three-dimensional chart illustrating visually a point cloud associated with an exemplary target and the boundary points extracted according to some embodiments.

In some embodiments, at step 304 boundary points are extracted from the target point cloud. Extracting boundary points provides downsampling of the target point cloud, reducing the number of points and therefore computational complexity of subsequent analysis. For example, FIG. 6 illustrates a target point cloud comprised of a plurality of points detected with respect to a target object (in this case, a vehicle). Boundary point extraction includes selecting a subset of points (in this example, indicated by large dots labeled "Boundary Points") that accurately represent the shape of the target object. It is desirable when extracting boundary points to extract the minimum number of points required while still maintaining sufficient information regarding the shape of the target object.

In some embodiments, boundary points are extracted by dividing a target point cloud into a plurality of small angular sections defining an angular resolution $\theta$ and then selecting a representative point from each of the small angular sections. In some embodiments, the small angular section is provided in two-dimensional space, such as at a particular azimuth angle (e.g., horizontal angle) relative to the sensor coordinate system. In some embodiments, the angular resolution $\theta$ is fixed. In other embodiments, the angular resolution $\theta$ is variable. In some embodiments, the angular resolution $\theta$ varies based on the distance of the points from the sensors, wherein the angular resolution $\theta$ is decreased for points located farther from the sensor (where the object covers a smaller angular range and points are more sparse) and the angular resolution $\theta$ is increased for points located closer to the sensor (where the object covers a larger angular range and points are more densely spaced). For example, in one embodiment the angular resolution $\theta$ is determined based on the following equation:

$$\theta = \min\left(\theta_{min}, \frac{d_{reso}}{d_{min}^i}\right) \qquad \text{Eq. (1)}$$

wherein $\theta_{min}$ is the minimum azimuth angular resolution, $d_{reso}$ is the desired distance between adjacent boundary points, and $d_{min}^i$ is the minimum distance to the sensor of a given target point cloud i. In one example, the minimum azimuth angular resolution $\theta_{min}$ is set to a value of approximately 0.3° (i.e., 0.005 radians), and the desired distance between adjacent boundary points is set to a value of 0.2 meters (m). In this way, as the minimum distance to a given target point cloud increases, the term $$\frac{d_{reso}}{d_{min}^i}$$

decreases, wherein if this term decreases to a value less that $\theta_{min}$ then the term $$\frac{d_{reso}}{d_{min}^i}$$

dictates the angular resolution of the boundary point extraction, and the angular resolution is likewise decreased to accommodate the lack of point density at greater distances. In some embodiments, within a particular angular section the point representing a minimum distance to the sensors is selected as representative of a boundary of the target object. In this way, a single point is extracted from each angular section. In some embodiments, extracted boundary points only include x and y values, wherein the vertical or z aspect of the points is not included. Because subsequent analysis is based on identifying the L-shaped geometry of the target object (from a top view perspective), the z component of the points is not required. In other embodiments, however, extracted points may include x, y, and z components. In some embodiments, target point clouds may be analyzed without downsampling of the target point cloud (i.e., without extraction of boundary points), although this is computationally more expensive.

In some embodiments, the process for extracting boundary points allows for the utilization of a plurality of beams—utilized by LiDAR sensors—scanning across multiple planes to be utilized, while preserving the shape of the target object. In some embodiments, this is a result of flattening the plurality of points into the x-y plane (ignoring the z component of the points).

Figure 7A:
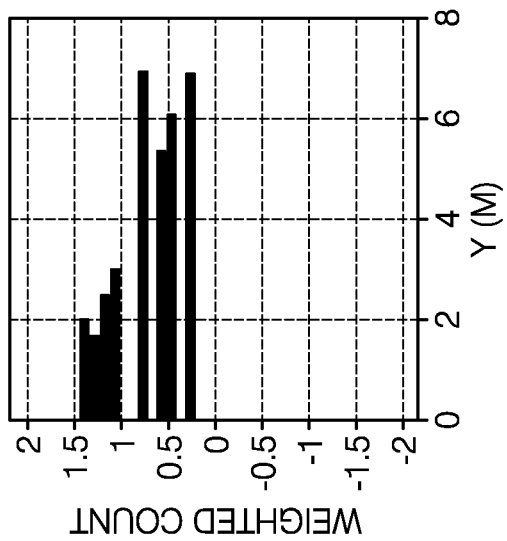
FIG. 7a is a graph illustrating the a target point cloud and extracted boundary points at a given rotational angle.
Figure 8A:
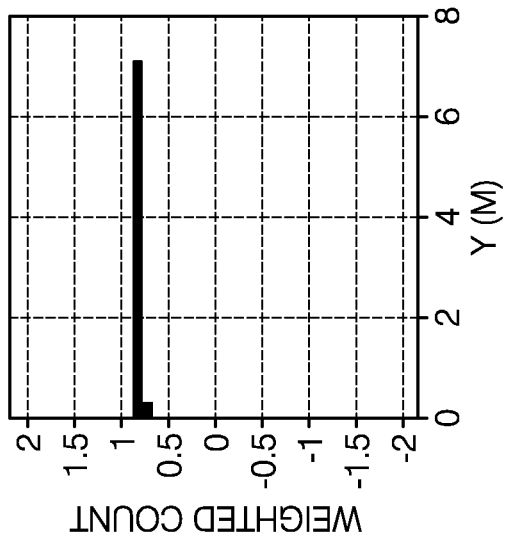
FIG. 8a is a graph illustrating the a target point cloud and extracted boundary points at a given rotational angle.

At step 306 an initial rotation angle is selected. As described in more detail below, the target point cloud (or at least the extracted points associated with the target point cloud) is rotated through a plurality of angles, with histograms generated at each angle utilized to locate the L-shape geometry of the target point cloud. In some embodiments, the target point cloud is rotated over 90°. In some embodiments, the initial rotation angle may be set to 0°. For example, FIG. 7a illustrates a target point cloud (comprised of a plurality of smaller points) as well as extracted boundary points (larger points) initialized to a first rotation angle. FIG. 8a illustrates the same target point cloud shown in FIG. 7a, but rotated to a second or subsequent rotation angle. In some embodiments, the target point cloud is rotated about a midpoint selected based on the plurality of points (or at least based on the plurality of extracted points) associated with the target object. For example, in some embodiments, the plurality of points are centered around points $(x_{mid}, y_{mid})$, wherein $$x_{mid} = \frac{x_{min} + x_{max}}{2}, \quad y_{mid} = \frac{y_{min} + y_{max}}{2}, \qquad \text{Eq. (2)}$$

Rotating about the point $x_{mid}$ and $y_{mid}$ as calculated in Eq. (2) results in the x and y values of the target point cloud being bounded within the range of $[-dist_{max}, dist_{max}]$, wherein $$dist_{max}=\sqrt{(x_{max}-x_{min})^2+(y_{max}-y_{min})^2}/2 \qquad \text{Eq. (3)}$$

At step 308 a weighted histogram is generated at a selected rotation angle. In some embodiments, generation of a weighted histogram includes generation of a first weighted histogram and generation of a second weighted histogram. The first weighted histogram is generated based on the distribution of points along the x-axis, and the second weighted histogram is generated based on the distribution of points along the y-axis. In some embodiments, the bins of the histograms are selected to range from $-dist_{max}$ to $dist_{max}$. In some embodiments, the bin widths are fixed. For example, each bin may be defined to have a width of approximately 0.1 meters (m). In this embodiment, the number of bins is variable and is based on the range of $-dist_{max}$ to $dist_{max}$. In other embodiments, the number of bins is fixed, and the width of each bin is determined by dividing the range $-dist_{max}$ to $dist_{max}$ by the fixed number of bins. In some embodiments, the index of a particular bin (for example, in the x direction) of a given point is calculated by the following equation:

$$idx^i = round((x^i-(-dist_{max}))/w_{bin}) \qquad \text{Eq. (4)}$$

with a similar equation being utilized to calculate the index of a given point in the y direction. In this way, points are assigned to bins.

Figure 7B:
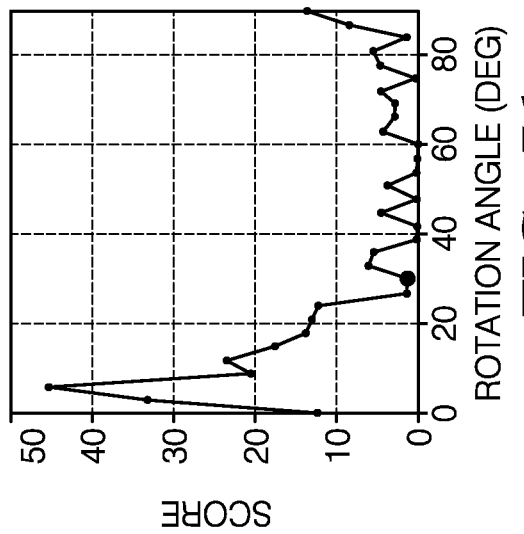
Figure 7C:
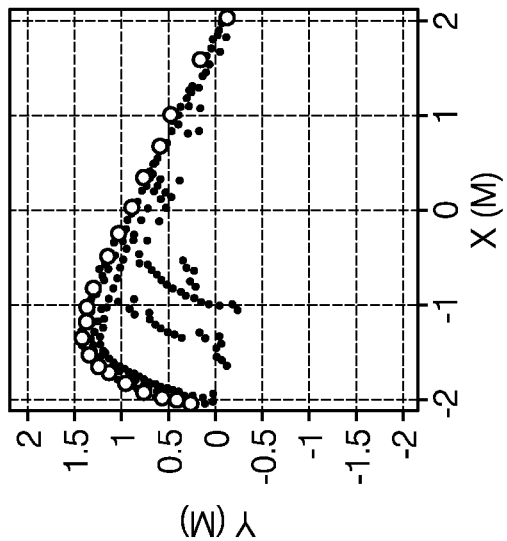
Figure 7D:
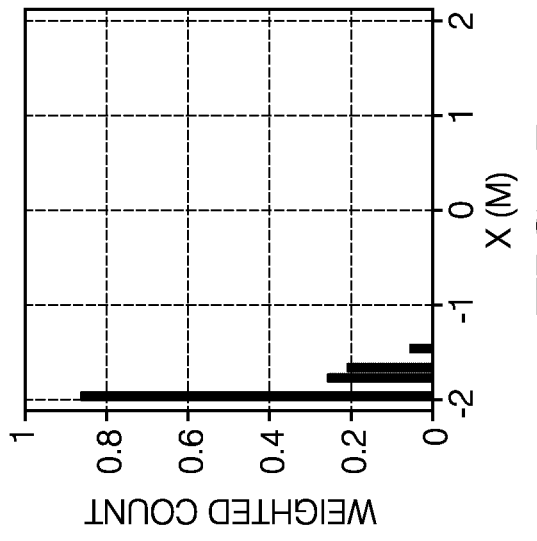
FIG. 7d is a chart illustrating scores associated with weighted histograms generated at a plurality of rotation angles.
Figure 8B:
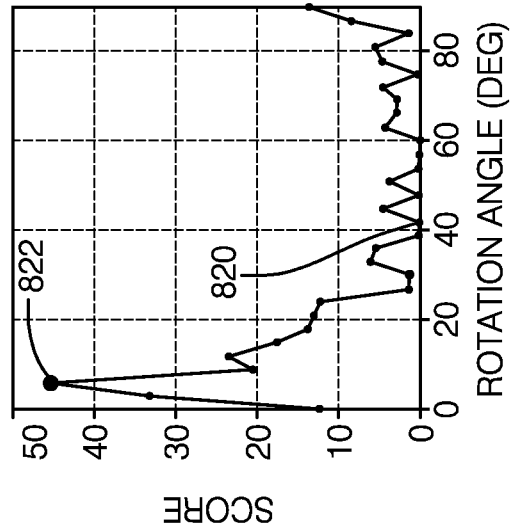
Figure 8C:
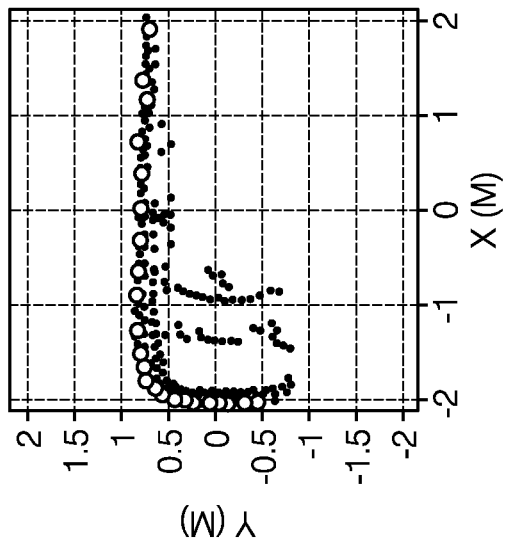

In addition to assigning points to bins, each bin is weighted based on a combination of number of points in the bin and distance spanned in a perpendicular direction of all points assigned to a particular bin. In some embodiments, the score is calculated using the following equation:

$$score_x^j = count_x^j * (y_{max}^j - y_{min}^j) \qquad \text{Eq. (5)}$$

Wherein $count_x^j$t is the number of points within the bin j in the x direction, and $y_{max}^j - y_{min}^j$ is the distance in the y direction spanned by the all the points located in the bin j. The score for the bins associated with the second weighted histogram are calculated in a similar way. The largest scores are generated wherein a bin has a large number of points in a particular bin in combination with a large distance spanned by the points in the perpendicular direction. For some bins, if only a single point is located in the bin, the distance spanned by points in the perpendicular direction will be zero because $y_{max}$ and $y_{min}$ will be equal to one another, resulting in a score of zero with respect to that bin. For example, FIG. 7b illustrates the first weighted histogram generated in response to the distribution of points along they axis as shown in FIG. 7a, and FIG. 7c illustrates the second weighted histogram generated in response to the distribution of points along the x axis as shown in FIG. 7a. In this example, each bin in both the x and y directions includes a few points (but none are densely populated) and the span of points in the perpendicular direction are not large. As a result, a number of bins have scores ranging from 0 to 7 (in the y direction) and 0 to 0.8 in the (x direction). In contrast, the scores of the bins shown in FIGS. 8b and 8c (generated with respect to the rotation of the target point cloud shown in FIG. 8a) are very high at particular bin locations. For example, with respect to the bins shown in FIG. 8b taken along the y axis, the bin location having a width between 0.7 and 0.8 along the y axis includes a number of extracted boundary points (~12), and these points span from approximately −1.5 m to 1.5 m (span of 3 meters) in the perpendicular direction (e.g., the x direction). As a result, the score generated for this bin would be the number of points (e.g., 12) multiplied by the span of points in the perpendicular direction (e.g., 3 m), for a total score of 36. However, most of the other bins shown in FIG. 8b are equal to zero due to only a single point being located in each bin and therefore no distance spanned in a perpendicular direction. The result is a well-defined peak in the graph shown in FIG. 8b. A similar calculation is performed for bins extending in the x direction as shown in FIG. 8c, with a corresponding well-defined peak corresponding with the bin extending from −1.9 to −2.0 in the x direction.

Figure 8D:
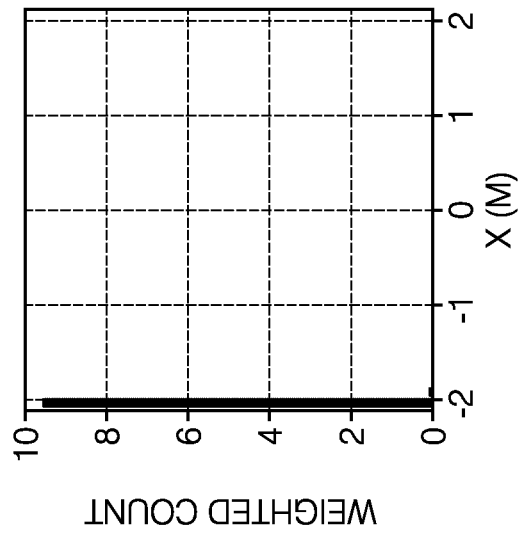
FIG. 8d is a chart illustrating scores associated with weighted histograms generated at a plurality of rotation angles.

At step 310, a net score is calculated based on the first and second weighted histograms generated at a particular angle of rotation. In some embodiments, the net score calculated is simply the sum of the largest score from the first weighted histogram and the largest score from the second weighted histogram at a given angle of rotation. For example, FIG. 8d illustrates the scores generated at a plurality of angles of rotation, with the point labeled 820 representing the score of the rotation angle shown in FIG. 7a and the point labeled 822 representing the score of the rotation angle shown in FIG. 8a. In this case, the point labeled 820 has a net score of approximately 7.8, resulting from the sum of the largest score from the first weighted histogram from FIG. 7b (approximately 7) and the largest score from the second weighted histogram from FIG. 7c (approximately 0.8). Similarly, the point labeled 822 has a net score of approximately 45, resulting from the sum of the largest score from the first weighted histogram from FIG. 8b (approximately 36) and the largest score from the second weighted histogram from FIG. 8c (approximately 9). In other embodiments, the net score based on the first weighted histogram and the second weighted histogram may utilize the scores from other bins.

At step 312 a determination is made whether a sufficient number of angles of rotation have been traversed. In some embodiments, because the shape to be recognized is L-shaped, a traversal of 90° of rotational angles is sufficient to find an L-shaped object. In the event the target point cloud has not been rotated more than the threshold amount, then at step 314 the rotation angle is incremented (i.e., the target point cloud is rotated by the incremented amount) and the process of generating weighted histograms for the rotated point cloud continues at step 308. In some embodiments, the increment to the rotation angle is fixed (e.g., 5°). In other embodiments, increments may vary based on the output of previously calculated weighted histograms. In other embodiments, a binary search may be utilized to locate the optimal orientation of the L-shaped object. As described in more detail with respect to FIG. 4, in some embodiments the method includes utilizing coarse increments (e.g., 5°) during a first, coarse analysis of point clouds, and utilizing fine increments (e.g., 1°) to provide additional precision in determining the pointing angle.

If a sufficient number of angles of rotation have been traversed, then at step 316 a determination is made regarding whether the target object is L-shaped. In some embodiments, this includes selecting the highest net score generated at step 310 and comparing the score to a threshold value. In some embodiments, the determination at step 316 includes determining the number of rotation angles resulting in a net score constituting a certain percentage (e.g., 80%) of the maximum net score measured. For example, for a set of given net scores measured over the plurality of angles of rotation (for example, as shown in FIG. 8d), the maximum score is noted (in this example, the maximum score is approximately forty-five), and a subsequent determination is made whether any of the other scores are within the threshold percentage of the determined maximum (e.g., 80% of forty-five, or approximately thirty-six). In this case, because the target point cloud is relative L-shaped, none of the other rotation angles generated a net score of thirty-six or more and therefore no rotation angles are identified as within a certain percentage of the maximum score. Those angles of rotation resulting in a net score that is within a certain percentage of the maximum score measured are included within a count $n_{uncertain}$, and the angular uncertainty associated therewith is calculated as follows:

$$u = n_{uncertain} * m [\text{deg}] \quad \text{Eq. (6)}$$

where m is the increment between adjacent angles of rotation. In some embodiments, the uncertainty u is compared to an uncertainty threshold $U_{thres}$, wherein if the uncertainty u is greater than the threshold Urges the target object is identified as not L-shaped. For example, in some embodiments the uncertainty threshold $U_{thres}$ is assigned a value of approximately 10°. As a result, if at a plurality of angles of rotation a plurality of relatively similar scores are generated without a clearly defined peak, this is indicative that the target object is not in fact L-shaped. In some embodiments, if the target is identified as not L-shaped, then at step 320 the pointing angle of the shape is either identified as a null value (i.e., no value assigned) or is assigned the pointing angle of the vehicle (i.e., assigned the same orientation as the heading of the vehicle).

In some embodiments, additional features may be utilized to determine whether a target object is L-shaped (or is L-shaped in the way indicative of a vehicle). For example, in some embodiments if the number of points associated with a target object is less than a threshold value, a determination is made that insufficient information is available to determine whether the target object is L-shaped. For example, if the target point cloud is comprised of less than 10 points, then the target object may be identified as not having an L-shape indicative of a vehicle. In other embodiments, if the points included in the target point cloud span a distance less than a threshold value (i.e., $dim_x$<2.5 meters and $dim_y$<2.5 meters), then a determination is made that the target object is not L-shaped or at least not L-shaped in a way that is indicative of a vehicle.

If at step 316 a determination is made that the target is L-shaped, then at step 318 the pointing angle is selected based on the angle of rotation that resulted in the largest score. For example, as shown in FIG. 8d, the pointing angle is determined based on the angle of rotation corresponding with the highest score (e.g., approximately 5°). If the target object is identified as not L-shaped at step 316, then at step 319 a default pointing angle may be assigned to the target. In some embodiments, the default pointing angle may be the orientation of the host vehicle. In other embodiments, the default pointing angle may be assigned based on the angle of rotation that resulted in the largest score despite a determination that the weighted histogram does not represent an L-shape. However, in either case the target object is identified as not L-shaped. For example, subsequent analysis of target objects identified as not L-shaped may be assumed to represent objects other than vehicles and treated accordingly.

At step 320 the pointing angle associated with the target object (whether L-shaped or not) is provided along with other information about the object (e.g., L-shaped) for post-processing of the target object. This may include generation of bounding boxes defining the boundaries of the target object (described in more detail with respect to FIG. 5, below) as well as target tracking (e.g., motion, heading, speed, etc.).

FIG. 4 is a flowchart illustrating in more detail an embodiment in which rotation of the point cloud and calculation of weighted histograms at each angle of rotation is bifurcated into two stages; a first, coarse adjustment of the angles of rotation described at steps 402 to 410 followed by a second, fine adjustment of the angles of rotation initialized based on the outcome of the coarse adjustments as described at steps 412 to 422.

The first coarse adjustment of the angles of rotation begins at step 402 by initializing the first angle of rotation. As described with respect to FIG. 3, the initial rotation angle selected may be set to a predetermined value (e.g., 0°). In other embodiments, the rotation angle may be initialized to a value operating as a best guess regarding the expected rotation angle, or to an angle that places the best guess of the expected rotation angle within the range of values to be traversed. For example, if it is expected that the angle of rotation of the L-shaped objects will be equal to approximately 0°, then the angle of rotation may be initialized to a value of −45° with an expectation that the angles of rotation will be traversed from −45° to 45° for a total of 90°.

At steps 404 and 406 first and second weighted histograms are generated at the selected rotation angle and scores are calculated based on the weighted histograms as described with respect to FIG. 3 above.

At step 408 a determination is made whether the desired angles of rotation have been traversed. As described above, in some embodiments the range of rotation angles to be traversed is equal to approximately 90°. In other embodiments, other thresholds may be utilized. If the desired angles of rotation have not been traversed, then at step 410 the angle of rotation is incremented by a coarse increment and the process repeats. For example, in some embodiments the coarse adjustment may be approximately 5°. This limits the number of iterations required to traverse the desired angles of rotation. For example, if the coarse increment is 5° and the desired angles of rotation to be traversed is approximately 90°, then the process only requires eighteen iterations.

At step 412, the second, fine adjustment of angles of rotation are initialized to a value selected based on the results of the first stage. In particular, the angle of rotation that resulted in the highest net score is utilized to initialize the second stage. In some embodiments, the angle of rotation is initialized to the coarse angle providing the highest net score less a value m, wherein m has a magnitude equal to the coarse increment less the fine increment (e.g., m=4 for a coarse increment of 5° and a fine increment of 1°). For example, if the coarse angle of rotation that provided the highest aggregate score was equal to 20° (with 5° increments), then the second stage may be initialized to a value of 16° with the expectation that the angle of rotation will be traverse from 16° to 24° by 1° increments.

At steps 414 and 416 first and second weighted histograms are generated at the selected rotation angle and scores are calculated based on the weighted histograms as described above.

At step 418 a determination is made whether the angles of rotation have been traversed. For example, if the angle of rotation is initialized to a value of 16°, and is expected to traverse angles of rotation in 1° increments up to 24°, then at step 418 a determination is made whether an angle of 24° has been reached. If the angles of rotation have not been traversed, then the angle of rotation is finely incremented at step 420.

At step 422, the weighted histograms and scores generated at steps 414-420 are utilized to determine whether the target object is L-shaped and the pointing angle of the target object. A benefit of the method described with respect to FIG. 4 is that the total number of iterations that need to be analyzed may be reduced while providing the desired precision associated with detecting the angle of rotation of the target object.

Figure 5:
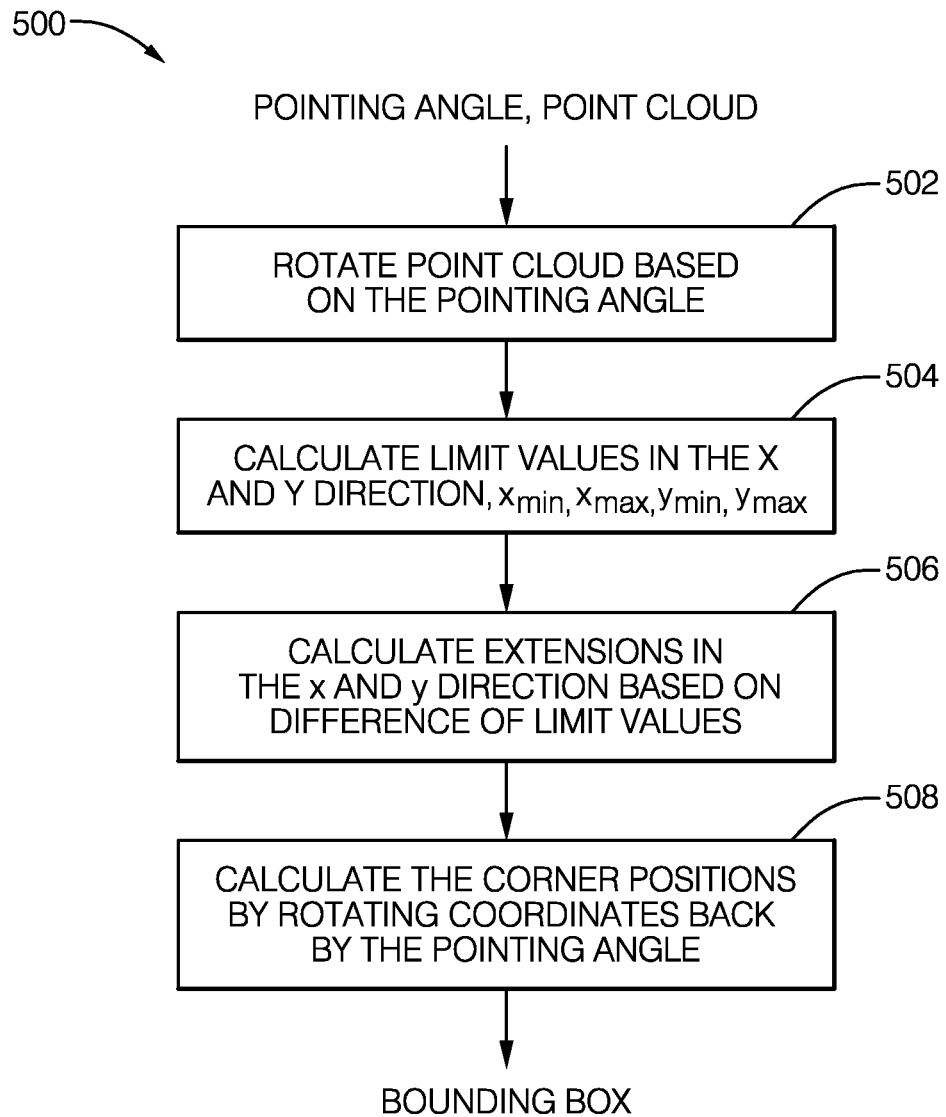
FIG. 5 is a flowchart illustrating steps implemented by the controller to identify the bounding box associated with a target object according to some embodiments.

Referring now to FIG. 5, a flowchart is provided that illustrates steps performed to identify a bounding box associated with a target object according to some embodiments. The method receives the pointing angle and target point cloud as inputs, wherein the pointing angle is determined using the methods described with respect to FIG. 3 or 4.

At step 502 the target point cloud is rotated based on the received pointing angle. For example, in some embodiments if the pointing angle is determined to be θ then the target point cloud is rotated by the angle −θ. In some embodiments, the entire target point cloud is rotated, not just the boundary points extracted for purposes of building the weighted histograms and determining the pointing angle as discussed with respect to FIGS. 3 and 4. In other embodiments, only the extracted points are rotated an utilized for generating the boundary box.

At step 504, limit values are calculated in the x and y directions based on the target point cloud. For example, this includes identifying the values $x_{min}$, $x_{max}$, $y_{min}$, and $y_{max}$, wherein $x_{min}$ is the minimum x value within the target point cloud, $x_{max}$ is the maximum x value within the target point, and so on.

At step 506, extensions are calculated in the x and y directions based on differences in the limit values. For example, extensions in the x direction are calculated based on the difference in the $x_{max}$ and $x_{min}$ values and extensions in the y direction are calculated based on the difference in the $y_{max}$ and $y_{min}$ values. The extensions can be utilized to define the location of the corners of the rotated target object. For example, the four corners of the L-shaped object are defined by ($x_{min}$, $y_{min}$), ($x_{min}$, $y_{max}$), ($x_{max}$, $y_{min}$), and ($x_{max}$, $y_{max}$).

At step 508, the four corners of the L-shaped object are rotated based on the determined pointing angle to locate the bounding box relative to the vehicle. The rotated bounding box is provided as an output. For example, in the embodiment shown in FIG. 1b, a plurality of bounding boxes are illustrated in the world coordinate system, wherein the bounding boxes describe the physical space occupied by the target object. In some embodiments, bounding boxes are generated for target objects regardless of whether the target objects are identified as L-shaped or not. However, in the embodiment shown in FIG. 1b, bounding boxes associated with L-shaped target objects are identified as such (solid lines) while bounding boxes associated with non-L-shaped objects are identified as non-L-shaped (e.g., dashed lines). In addition, the pointing angles associated with L-shaped target objects are determined based on the angle of rotation that generated the highest score. As discussed above, in some embodiments the pointing angle of non-L-shaped target objects is set to a default value.

In this way, the disclosure provides a system and method of identifying whether target objects are L-shaped and, if so, identifying the pointing angle of the target object in a computationally efficient manner.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

In some aspects, a method of determining a pointing angle of a target object includes receiving a target point cloud representing at least a portion of the target object, the target point cloud comprised of a plurality of points defined by a distance from a sensor. The target point cloud is rotated through a plurality of rotation angles and a first weighted histogram and a second weighted histogram is generated for each of the plurality of rotation angles, wherein the first weighted histogram includes a first plurality of bins, each bin having a width defined in an x-axis, wherein the second weighted histogram includes a second plurality of bins, each bin having a width defined in a y-axis, wherein each bin is weighted based on a number of points located within the bin and a distance between points in a direction perpendicular to a width of the bin. A score is generated for each of the plurality of rotation angles based on the first weighted histogram and the second weighted histogram. The pointing angle of the target object is identified based on the scores generated for each of the plurality of rotation angles.

The method of the preceding paragraph can optionally include, additionally and/or alternatively any, one or more of the following features, configurations and/or additional components.

For example, in some embodiments the method may further include extracting boundary points from the target point cloud, wherein the first weighted histogram and second weighted histogram generated at each of the plurality of rotation angles is generated based on the extracted boundary points.

In some embodiments, extracting boundary points from the target point cloud may include dividing the target point cloud into a plurality of angular sections, wherein extraction of boundary points includes selecting a single point from each angular section.

In some embodiments, selecting the single point from each angular section may include selecting a point with a minimum distance from the sensor.

In some embodiments, the plurality of rotation angles may span approximately 90 degrees.

In some embodiments, rotating the target point cloud through a plurality of rotation angles further may further include coarsely rotating the target point cloud through a first plurality of rotation angles, each separated by a first angle and finely rotating the target point cloud through a second plurality of rotation angles, each separate by a second angle, wherein the second plurality of rotation angles are based on scores generated by the first plurality of rotation angles.

In some embodiments, determining if the target object is L-shaped may be based on the score generated at each of the plurality of angles of rotation.

In some embodiments, if the target object is determined to be L-shaped, then the target object may be assigned a pointing angle based on the scores generated at each of the plurality of rotation angles.

In some embodiments, determining if the target object is L-shaped may include calculating an uncertainty value associated with the target object based on the scores generated with respect to each of the plurality of rotation angles.

In some embodiments, the method may further include calculating a bounding box associated with the target object based on the identified pointing angle.

According to another aspect, an L-shaped target detection system includes a sensor and a controller. The sensor is configured to generate a point cloud comprised of a plurality of points generated with respect to targets located proximate to the sensor, wherein points associated with a particular target comprise target point clouds. The controller is configured to receive the point cloud generated by the sensor, wherein the controller is configured to rotate the target point cloud through a plurality of rotation angles. The controller generates a first weighted histogram and a second weighted histogram for each of the plurality of rotation angles, wherein the first weighted histogram includes a first plurality of bins, each bin having a width defined in an x-axis, wherein the second weighted histogram includes a second plurality of bins, each bin having a width defined in a y-axis, wherein each bin is weighted based on a number of points located within the bin and a distance between points in a direction perpendicular to a width of the bin. The controller generates a score for each of the plurality of rotation angles based on the first weighted histogram and the second weighted histogram. The controller identifies the pointing angle of the target object based on the scores generated for each of the plurality of rotation angles.

The system of the preceding paragraph can optionally include, additionally and/or alternatively any, one or more of the following features, configurations and/or additional components.

For example, in some embodiments the sensors may be light detection and ranging (LiDAR) sensors.

In some embodiments, the controller may be further configured to extract boundary points from the target point cloud, wherein the first weighted histogram and second weighted histogram generated at each of the plurality of rotation angles is generated based on the extracted boundary points.

In some embodiments, extracting boundary points from the target point cloud may include dividing the target point cloud into a plurality of angular sections, wherein extraction of boundary points includes selecting a single point from each angular section.

In some embodiments, the controller may be configured to rotate the target point cloud through a first plurality of rotation angles, each separated by a first coarse increment and rotate the target point cloud through a second plurality of rotation angles, each separated by a second fine increment, wherein initialization of the second plurality of rotation angles is based on scores generated by the first plurality of rotation angles.

In some embodiments, the controller may be configured to determine if the target object is L-shaped based on the score generated at each of the plurality of angles of rotation.

In some embodiments, the controller may be configured to determine if the target object is L-shaped by calculating an uncertainty value associated with the target object based on the scores generated with respect to each of the plurality of rotation angles, wherein the target is identified as L-shaped if the uncertainty value is less than a threshold.

According to another aspect, a method of detecting L-shaped target objects within a point cloud may include rotating a target point cloud through a plurality of rotation angles and generating at least one weighted histogram for each of the plurality of rotation angles. The weighted histogram includes a first plurality of bins, each bin having a width defined in a first axis, wherein each bin is weighted based on a number of points located within the bin and a distance between points in a direction perpendicular to a width of the bin. The method further includes generating a score for each of the plurality of rotation angles based on the at least one weighted histogram and determining whether a target point cloud is L-shaped based on the generated scores.

The method of the preceding paragraph can optionally include, additionally and/or alternatively any, one or more of the following features, configurations and/or additional components.

For example, in some embodiments generating at least one weighted histogram may include generating a first weighted histogram and a second weighted histogram for each of the plurality of rotation angles, wherein the first weighted histogram includes a first plurality of bins. Each bin having a width defined in an x-axis, wherein the second weighted histogram includes a second plurality of bins, each bin having a width defined in a y-axis, wherein each bin is weighted based on a number of points located within the bin and a distance between points in a direction perpendicular to a width of the bin.

In some embodiments, the plurality of rotation angles may span approximately 90 degrees.

The invention claimed is:

1. A method of determining a pointing angle of an L-shaped target object relative to a vehicle, the method comprising:
   determining distances of a plurality of points on the L-shaped target object relative to the vehicle using a light detection and ranging (LiDAR) sensor disposed on the vehicle;
   generating a target point cloud representing at least a portion of the L-shaped target object, the target point cloud comprised of the distances of the plurality of points on the L-shaped target object relative to the vehicle;
   rotating the target point cloud through a plurality of rotation angles;
   generating a first weighted histogram and a second weighted histogram for each of the plurality of rotation angles, wherein the first weighted histogram includes a first plurality of bins, each bin of the first plurality of bins having a first width defined in an x-axis, wherein the second weighted histogram includes a second plurality of bins, each bin of the second plurality of bins having a second width defined in a y-axis, and wherein each bin of both the first plurality of bins and the second plurality of bins is weighted based on a total number of points located within the bin and a distance between a maximum point and a minimum point in a direction perpendicular to the width of the bin;
   generating a score for each of the plurality of rotation angles based on the first weighted histogram and the second weighted histogram; and
   determining the pointing angle of the L-shaped target object relative to the vehicle based on the scores generated for each of the plurality of rotation angles.

2. The method of claim 1, further including extracting boundary points from the target point cloud, wherein the first weighted histogram and second weighted histogram generated at each of the plurality of rotation angles is generated based on the extracted boundary points.

3. The method of claim 2, wherein extracting boundary points from the target point cloud includes dividing the target point cloud into a plurality of angular sections, wherein extraction of boundary points includes selecting a single point from each angular section.

4. The method of claim 3, wherein selecting the single point from each angular section includes selecting a point with a minimum distance from the sensor.

5. The method of claim 1, wherein rotating the target point cloud through the plurality of rotation angles further includes:
rotating the target point cloud through a first plurality of rotation angles, each separated by a first angle; and
rotating the target point cloud through a second plurality of rotation angles, each separate by a second angle,
wherein the first angle is greater than the second angle, and the second plurality of rotation angles are based on scores generated by the first plurality of rotation angles.

6. The method of claim 1, further including:
determining if the target object is L-shaped based on the score generated at each of the plurality of angles of rotation.

7. The method of claim 6, wherein if the target object is determined to be L-shaped, then the L-shaped target object is assigned the pointing angle based on the scores generated at each of the plurality of rotation angles.

8. The method of claim 6, wherein determining if the target object is L-shaped includes calculating an uncertainty value associated with the target object based on the scores generated with respect to each of the plurality of rotation angles.

9. The method of claim 1, further including:
calculating a bounding box associated with the L-shaped target object based on the identified pointing angle.

10. An L-shaped target detection system, comprising:
a light detection and ranging (LiDAR) sensor disposed on a vehicle configured to generate a point cloud comprised of a plurality of points generated with respect to targets located proximate to the LiDAR sensor, wherein points associated with a particular target comprise target point cloud;
a controller located on the vehicle configured to receive the target point cloud from the sensor, wherein the controller is configured to:
rotate the target point cloud through a plurality of rotation angles;
generate a first weighted histogram and a second weighted histogram for each of the plurality of rotation angles, wherein the first weighted histogram includes a first plurality of bins, each bin of the first plurality of bins having a first width defined in an x-axis, wherein the second weighted histogram includes a second plurality of bins, each bin of the second plurality of bins having a second width defined in a y-axis, wherein each bin of both the first plurality of bins and the second plurality of bins is weighted based on a total number of points located within the bin and a distance between a maximum point and a minimum point in a direction perpendicular to the width of the bin;
generate a score for each of the plurality of rotation angles based on the first weighted histogram and the second weighted histogram; and
determine the pointing angle of the target object relative to the vehicle based on the scores generated for each of the plurality of rotation angles.

11. The L-shaped target detection system of claim 10, wherein the controller is further configured to extract boundary points from the target point cloud, wherein the first weighted histogram and second weighted histogram generated at each of the plurality of rotation angles is generated based on the extracted boundary points.

12. The L-shaped target detection system of claim 11, wherein extracting boundary points from the target point cloud includes dividing the target point cloud into a plurality of angular sections, wherein extraction of boundary points includes selecting a single point from each angular section.

13. The L-shaped target detection system of claim 10, wherein the controller is configured to rotate the target point cloud through a first plurality of rotation angles, each separated by a first increment and rotate the target point cloud through a second plurality of rotation angles, each separated by a second increment, wherein the first increment is greater than the second increment, and initialization of the second plurality of rotation angles is based on scores generated by the first plurality of rotation angles.

14. The L-shaped target detection system of claim 10, wherein the controller is configured to determine if the target object is L-shaped based on the score generated at each of the plurality of angles of rotation.

15. The L-shaped target detection system of claim 14, wherein the controller is configured to
determine if the target object is L-shaped by calculating an uncertainty value associated with the target object based on the scores generated with respect to each of the plurality of rotation angles, wherein the target is identified as L-shaped if the uncertainty value is less than a threshold.

16. A method of detecting L-shaped target objects relative to a vehicle, the method comprising:
determining distances of a plurality of points on a target object relative to the vehicle using a light detection and ranging (LiDAR) sensor disposed on the vehicle;
generating a target point cloud representing at least a portion of the target object, the target point cloud comprised of the distances of the plurality of points on the target object relative to the vehicle;
receiving the target point cloud from the LiDAR sensor;
rotating the target point cloud through a plurality of rotation angles;
generating at least one weighted histogram for each of the plurality of rotation angles, wherein the weighted histogram includes a first plurality of bins, each bin having a width defined in a first axis, wherein each bin of both the first plurality of bins and a second plurality of bins is weighted based on a total number of points located within the bin and a distance between a maximum point and a minimum point in a direction perpendicular to the width of the bin;
generating a score for each of the plurality of rotation angles based on the at least one weighted histogram; and
determining whether the target object is L-shaped based on the generated scores.

17. The method of claim 16,
wherein generating at least one weighted histogram includes generating a first weighted histogram and a second weighted histogram for each of the plurality of rotation angles, wherein the first weighted histogram includes the first plurality of bins, each bin of the first plurality of bins having a first width defined in an x-axis, wherein the second weighted histogram includes the second plurality of bins, each bin of the second plurality of bins having a second width defined in a y-axis, wherein each bin of both the first plurality of bins and the second plurality of bins is weighted based on a number of points located within the bin and a distance between points in a direction perpendicular to the width of the bin.

18. The method of claim 16, wherein the plurality of rotation angles spans approximately 90 degrees.

* * * * *

UNITED STATES PATENT AND TRADEMARK OFFICE
CERTIFICATE OF CORRECTION

| | |
|---|---|
| PATENT NO. | : 11,668,799 B2 |
| APPLICATION NO. | : 16/825242 |
| DATED | : June 6, 2023 |
| INVENTOR(S) | : Mo Wu |

It is certified that error appears in the above-identified patent and that said Letters Patent is hereby corrected as shown below:

In the Claims

Column 15, Line 59, Claim 10 "ay-axis" should read --a y-axis--

Column 17, Line 5, Claim 17 "ay-axis" should read --a y-axis--

Signed and Sealed this
Thirteenth Day of February, 2024

Katherine Kelly Vidal
*Director of the United States Patent and Trademark Office*